Feb. 16, 1932.    E. H. SAVAGE    1,845,816
FRAME STRUCTURE
Filed May 11, 1929

INVENTOR.
Edwin H. Savage
BY Harvey R. Hawgood
ATTORNEY

Patented Feb. 16, 1932

1,845,816

UNITED STATES PATENT OFFICE

EDWIN H. SAVAGE, OF CLEVELAND, OHIO, ASSIGNOR TO THE WHITE MOTOR COMPANY, OF CLEVELAND, OHIO, A CORPORATION OF OHIO

FRAME STRUCTURE

Application filed May 11, 1929. Serial No. 362,223.

This invention relates to automotive vehicles and more particularly to the frame structures thereof.

An object of the invention is to provide an improved frame structure which will efficiently transmit both carrying and pulling loads to the frame of the vehicle.

Another object is to provide such a frame structure which may be easily and economically fabricated and assembled.

Other objects will hereinafter appear.

Figure 1:
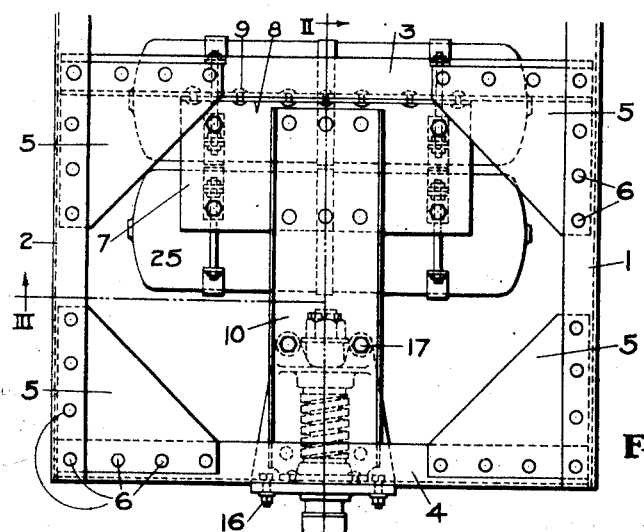
Figure 2:
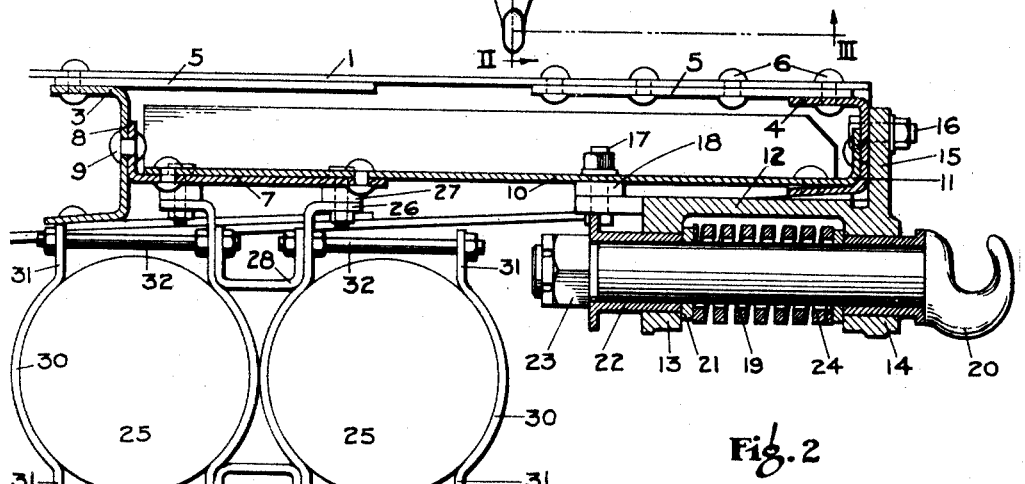
Figure 3:
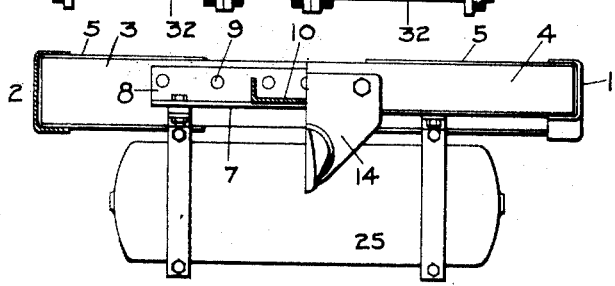

The invention will be better understood from the description of one practical embodiment thereof, illustrated in the accompanying drawings, in which:

Figure 1 is a plan view of the rear part of the frame of automobile truck embodying the present invention;

Figure 2 a longitudinal sectional view thereof, on a larger scale, and;

Figure 3 is a view partly in rear elevation and partly in section of the frame of the preceding figures.

The frame of the vehicle illustrated consists of two side members 1 and 2 of channel-shaped cross section joined together by two transverse frame members 3 and 4, also of channel-shaped cross section, the joints between the side and transverse members being stiffened by gusset plates 5 secured to the frame members by rivets 6. These parts are similar to those used in conventional bus and truck frame building.

A plate 7 having an upwardly turned flange 8 along its forward edge is carried by the forward transverse member 3 by means of rivets 9 passing through the flange and the web of the transverse member. This plate constitutes a kind of shelf extending nearly across the frame of the vehicle which provides a convenient surface from which to sling articles to be carried by the frame and at the same time very greatly stiffens the transverse member and adapts it for transmitting loads longitudinally of the frame to the side frame members.

Centrally of the vehicle frame is a channel 10 having its forward end resting upon and riveted to plate 7 and having the rear part of its web turned upwardly to form a flange 11 which is received within the rear transverse member 4 and riveted to its web. A draw bar carrier consisting of a base 12 and two depending bearings 13 and 14 is suspended beneath the longitudinal member, the rear end of the base forming upwardly extending flange 15 which is attached by bolts 16 to the web of the rear transverse member. Bolts 17 extend through the forward end of the base and through the web of the longitudinal central member, the base being spaced from the member by means of washers 18. A draw bar consisting of a rod 19 extends through the bearings and it is provided at its outer end with a hook 20 by which it may be connected to a trailer or the like. A collar 21 surrounds the draw bar adjacent the forward bearing and is adjustable by means of a sleeve 22 and nut 23. A compression spring 24 is positioned between the collar and the rear bearing so that the load is not rigidly coupled to the vehicle frame.

Suspended beneath the shelf are two tanks 25. The carriers for these tanks consist of two sets of slings, one set being adjacent each end of the shelf. These slings consist of a central member formed of two pieces of strap metal each having an upper horizontal end 26 bolted to the underside of the shelf and held in properly spaced relation thereto by washers 27. The straps then bend downwardly and are spaced apart by a U-shaped clip or spacer 28 bolted to them. Below the clip they curve toward each other, having a curvature which fits the exterior of the tank, until they touch on a level with the center line of the tanks, from which point they diverge, still curving to fit the exterior of the tanks, and their ends are bent downwardly and held in proper relation by a second U-shaped spacer 29.

The tanks are positioned against the curved portion of the above described straps and two straps each consisting of a curved central portion 30 and vertical ends 31 are placed upon their outer surfaces and attached to the central straps by tie bolts 32.

From the above it will be seen that the shelf serves to stiffen the frame and carry centrally applied longitudinal loads to the side frame members, the loads being transmitted to it by the centrally disposed longitudinal member, while at the same time both the shelf and longitudinal member form a rigid structure for supporting the tanks or other load beneath the frame.

While I have described the illustrated embodiment of my invention in some particularity, obviously many others will readily occur to those skilled in this art, and I do not, therefore, limit myself to the precise details shown and described, but claim as my invention all variations, modifications and embodiments thereof coming within the scope of the appended claims.

I claim:

1. In an automotive vehicle, a frame including longitudinal side frame members and transverse frame members, a shelf-like flange carried by one of said transverse members and extending throughout the central portion thereof, and a central longitudinal member secured at one end to said flange and at the other end to the next successive transverse member.

2. In an automotive vehicle a frame including side frame members and channel-shaped transverse frame members, a shelf-like flange secured to one of said transverse members, and a central longitudinal extending member connected to said flange and to the next succeeding transverse member.

3. In an automotive vehicle a frame including side frame members and channel-shaped transverse frame members, a shelf-like flange adapted to support load carrying slings secured to one of said transverse members, and a central longitudinally extending member adapted to support a draw bar and transmit draft loads to the side frame members connected to said flange and to the next succeeding transverse member.

4. In an automotive vehicle having a frame including longitudinal side frame members and two transverse frame members, stiffening means between the ends of one of said transverse members and said longitudinal side frame members, a horizontal plate having a vertical flange along its forward edge and extending transversely the vehicle frame with the flange secured to said transverse member between said stiffening means, and a channel-shaped longitudinally extending member disposed centrally of the frame, and having its web secured at one end upon said plate, and at its other end to the second transverse frame member.

5. In an automotive vehicle having a frame including longitudinal side frame members and two transverse frame members, gusset plate secured to the ends of said transverse frame members and to said longitudinal side frame members, a horizontal plate having a vertical flange along its forward edge and extending transversely the vehicle frame with the flange secured to the forward transverse member between said gusset plates, and a channel-shaped longitudinally extending member disposed centrally of the frame, and having its web secured at one end upon said plate, and at its other end to the second transverse frame member.

6. An automotive vehicle having a frame including channel-shaped side frame members having their webs vertical and their flanges extending inwardly, channel-shaped transverse frame members also having their webs vertical and their flanges extending in the same direction, an angle-shaped plate having one leg secured to the web of one of said transverse members and the other extending in a direction opposite to the flanges of said member, and a central longitudinal member secured to said last mentioned leg and to one of the flanges of the next successive transverse member.

7. An automotive vehicle having a frame including channel-shaped side frame members having their webs vertical and their flanges extending inwardly, channel-shaped transverse frame members also having their webs vertical and their flanges extending in the same direction, an angle-shaped plate having one leg secured to the web of one of said transverse members and the other extending in a direction opposite to the flanges of said member, a central longitudinal member secured to said last mentioned leg and to one of the flanges of the next successive transverse member, and draft gear secured to said central member whereby draft stresses are transmitted through the shelf-like flange to adjacent the side frame members.

In testimony whereof I hereunto affix my signature this 10th day of May, 1929.

EDWIN H. SAVAGE.